Patented Dec. 5, 1922.

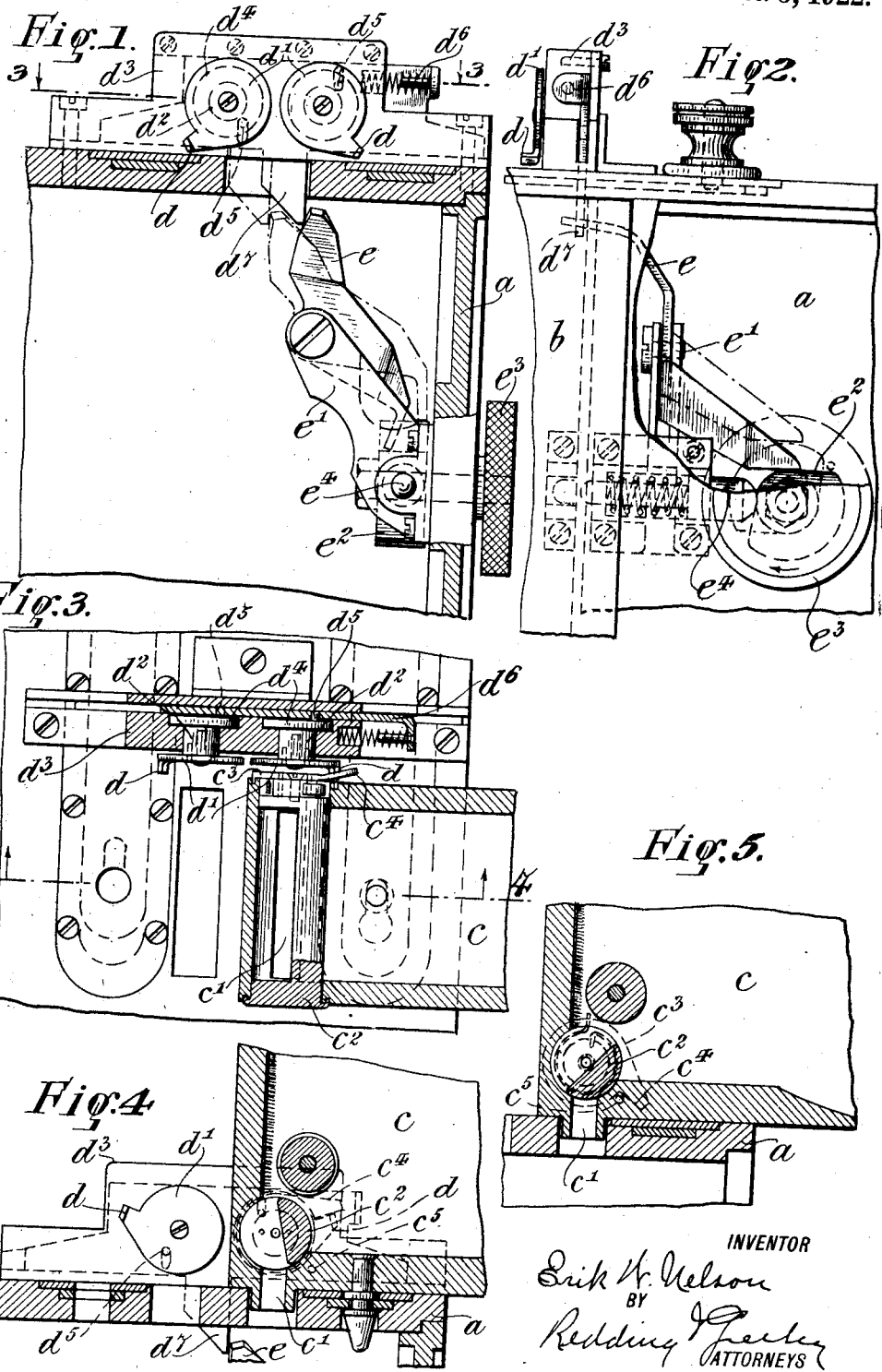

1,437,989

UNITED STATES PATENT OFFICE.

ERIK W. NELSON, OF NEW ROCHELLE, NEW YORK.

MAGAZINE LIGHT TRAP FOR MOTION-PICTURE CAMERAS.

Application filed June 4, 1921. Serial No. 474,943.

*To all whom it may concern:*

Be it known that I, ERIK W. NELSON, a citizen of the United States, and a resident of New Rochelle, in the State of New York, have invented certain new and useful Improvements in Magazine Light Traps for Motion-Picture Cameras, of which the following is a specification, reference being had to the accompanying drawings, forming a part hereof.

This invention has for its object to facilitate and increase convenience in the use of the camera by the operator. The magazine light trap, which prevents the ingress of light to either magazine when removed from the camera or when the camera door is open, is operated by the knob or handle which locks and unlocks the door of the camera, so that the light trap is automatically closed before the camera door is opened and is automatically opened when the camera door is closed and locked. The several features of the invention will be explained more fully hereinafter with reference to the accompanying drawings in which they are illustrated and in which—

Figures 1, 2, 3, 4, and 5 are detail views in section showing the magazine light trap and the means for opening and closing the same through the movement of the handle or knob of the door of the camera box, the film magazines being omitted from Figures 1 and 2 while one of the magazines is shown in part in Figures 3, 4 and 5, Figure 3 being a partial section on the plane indicated by the broken line 3—3 of Figure 1, Figure 4 being a partial section on the plane indicated by the broken line 4—4 of Figure 3 and Figure 5 being a partial view showing the light trap in a position different from that indicated in Figure 4.

The improved camera shown in the drawings has the usual box or casing $a$, with a hinged door $b$ to give access to the interior of the camera, on the film side and the magazines $c$, detachably mounted on the top of the camera box.

The film magazines $c$, are mounted detachably, as usual, on the top of the camera and each is provided with a film slot $c'$ and with an oscillatory, spring pressed light trap $c^2$ which is held normally in closed position by its spring. A plate $c^3$, secured to one end of the light trap, has a finger $c^4$ which rests normally against a stop pin $c^5$ and also stands in the path of a projection $d$ on a disc-like actuator $d'$, secured to a hub $d^2$ which is mounted rotarily in a block or housing $d^3$ secured on the top of the camera box. The hub $d^2$ has at its other end a disc $d^4$ which has an eccentric pin $d^5$ engaged by a spring pressed slide $d^6$ also mounted in the housing $d^3$. By movement of the slide $d^6$ against its spring, the actuator $d'$ is oscillated and its projecting lug $d$ causes the rotation of the light trap $c^2$ from the closed position shown in Figure 5 to the open position shown in Figure 4. The slide $d^6$ has a projecting lug $d^7$ on its lower edge which passes through a slot into the path of one end of a lever $e$ which is pivoted on a bracket $e'$ and has its lower end resting on a cam $e^2$ which is carried by the shaft of the knob or handle $e^3$ which also actuates the bolt $e^4$ by which the door $b$ is locked. Whenever the knob or handle $e^3$ is manipulated to lock the door it causes, through the described connections, the light trap $c^2$ to be moved from closed to open position, and when the knob is moved to unlock the door it permits the light trap to be moved by the coacting springs from its open to its closed position. The light trap, therefore, is closed automatically whenever the door of the camera box is unlocked, preparatory to opening, and is permitted to open whenever the door is unlocked. If either magazine is removed from the camera the light trap is closed by its spring regardless of the condition of the door lock.

I claim as my invention:

1. In a moving picture camera, the combination of a camera box, a door therefor, a latch for the door, an operating handle for the latch, a film magazine, a light trap for the magazine and intermediate devices whereby the light trap is shifted by the movement of the latch handle.

2. In a moving picture camera, the combination of a camera box, a door therefor, a latch for the door, an operating handle for the latch, a film magazine, a light trap for the magazine, a lever operated by movement of the latch handle and intermediate devices operated by the lever to shift the light trap.

3. In a moving picture camera, the combination of a camera box, a door therefor, a latch for the door, an operating handle for the latch, a film magazine, a light trap for the magazine, a lever operated by the movement of the latch handle, a slide operated by movement of the lever, and intermediate devices whereby the light trap is shifted by movement of the slide.

4. In a moving picture camera, the combination of a camera box, a door therefor, a latch for the door, an operating handle for the latch, a film magazine, a light trap for the magazine, a lever operated by movement of the latch handle, a slide operated by movement of the lever, and a shaft operated by movement of the slide and carrying a projecting lug adapted to engage and shift the light trap.

5. In a moving picture camera, the combination of a camera box, a film magazine, a rotary light trap having a radial arm, a shaft mounted on the camera box and having a radially projecting lug for engagement with the arm of the light trap, and means to oscillate the shaft to shift the light trap.

6. In a moving picture camera, the combination of a camera box, a film magazine, a rotary light trap having a radial arm, a shaft mounted on the camera box and having a radially projecting lug for engagement with the arm of the light trap, a door for the camera box, a latch for the door, a latch handle and intermediate devices whereby the shaft is rocked by movement of the latch handle.

This specification signed this 3d day of June A. D. 1921.

ERIK W. NELSON.